Sept. 11, 1951 P. DE ANGUERA 2,567,191
PIN INSERTING MACHINE FOR MAKING A STRUCTURAL UNIT
Filed Nov. 1, 1946 6 Sheets-Sheet 1

Fig. 1

INVENTOR.
Philip de Anguera
BY
Murray, Sackhoff & Paddack
ATT'YS

Sept. 11, 1951 P. DE ANGUERA 2,567,191
PIN INSERTING MACHINE FOR MAKING A STRUCTURAL UNIT
Filed Nov. 1, 1946 6 Sheets-Sheet 2

INVENTOR.
Philip de Anguera
BY
Murray, Sackhoff & Paddock
ATT'YS

Patented Sept. 11, 1951

2,567,191

UNITED STATES PATENT OFFICE 2,567,191

PIN INSERTING MACHINE FOR MAKING STRUCTURAL UNITS

Philip de Anguera, Cincinnati, Ohio, assignor to Eva de Anguera, Cincinnati, Ohio Application November 1, 1946, Serial No. 707,127

4 Claims. (Cl. 144—31)

1

The present invention relates to a method and a machine for making a structural member and is particularly directed to means for manufacturing a composite member from a number of wood strips having indiscriminate lengths. Said composite member and the novel features therefor form the subject matter of my copending application, Serial Number 676,440, filed June 13, 1946, and now abandoned.

An object of this invention is to provide a means for economically interconnecting, in adjacent rows, a number of wood strips of unequal lengths to thereby produce a structural unit adapted for flooring panel in the construction of truck bodies, barge or ship decks, railroad freight cars, in factories and warehouses, or in other places which are subject to intense wear and are constantly exposed to changes of temperature and/or moisture conditions.

Another object of the invention is to provide a new and useful machine of the foregoing character in which the parts are so combined and organized that the structural member is produced continuously and economically in a single length.

A further object of the invention is to provide an integrated means for assembling, feeding and interconnecting a number of unequal lengths of wood strips into a composite structural member.

The invention also contemplates a sequence of novel, operational steps for accomplishing the foregoing novel functions and results.

To the above end, generally stated, the invention consists of the novel steps, devices, and combination of devices, hereinafter described and defined in the appended claims.

Referring to the drawings:

Fig. 7 is a cross-sectional view taken on line 7—7 of Fig. 6.

Fig. 8 is an enlarged cross-sectional view of the

2 pin feeding device in the position illustrated in Fig. 7.

Fig. 9 is a view similar to that of Fig. 8 showing the pin feeding device in an intermediate pin feeding position.

The preferred embodiment of my invention comprises a machine having a wood strip assembling station A, a drilling station B, a pin driving station C, and a means D for intermittently advancing the assembled strips through a work guide 30 extending across the machine bed. A cutting station E is also provided at the work exit end for the machine for sawing the continuously formed structural member into suitable lengths, if desired. At the assembling station A a number of indiscriminate lengths of wood strips are manually placed upon the upper reach of a traveling conveyor to form a number of longitudinally disposed, adjacent rows of strips. These assembled strips are constantly urged toward the intermittently actuated work advancing means D which progressively feeds the assembled strips through a work guide 30 extending across the machine bed. The assembled strips are progressively drilled and pinned at the stations B and C respectively and the interconnected strips forming a continuous structural member are ejected from the machine toward a cutting station E where said member is cut into suitable lengths.

Figure 1:
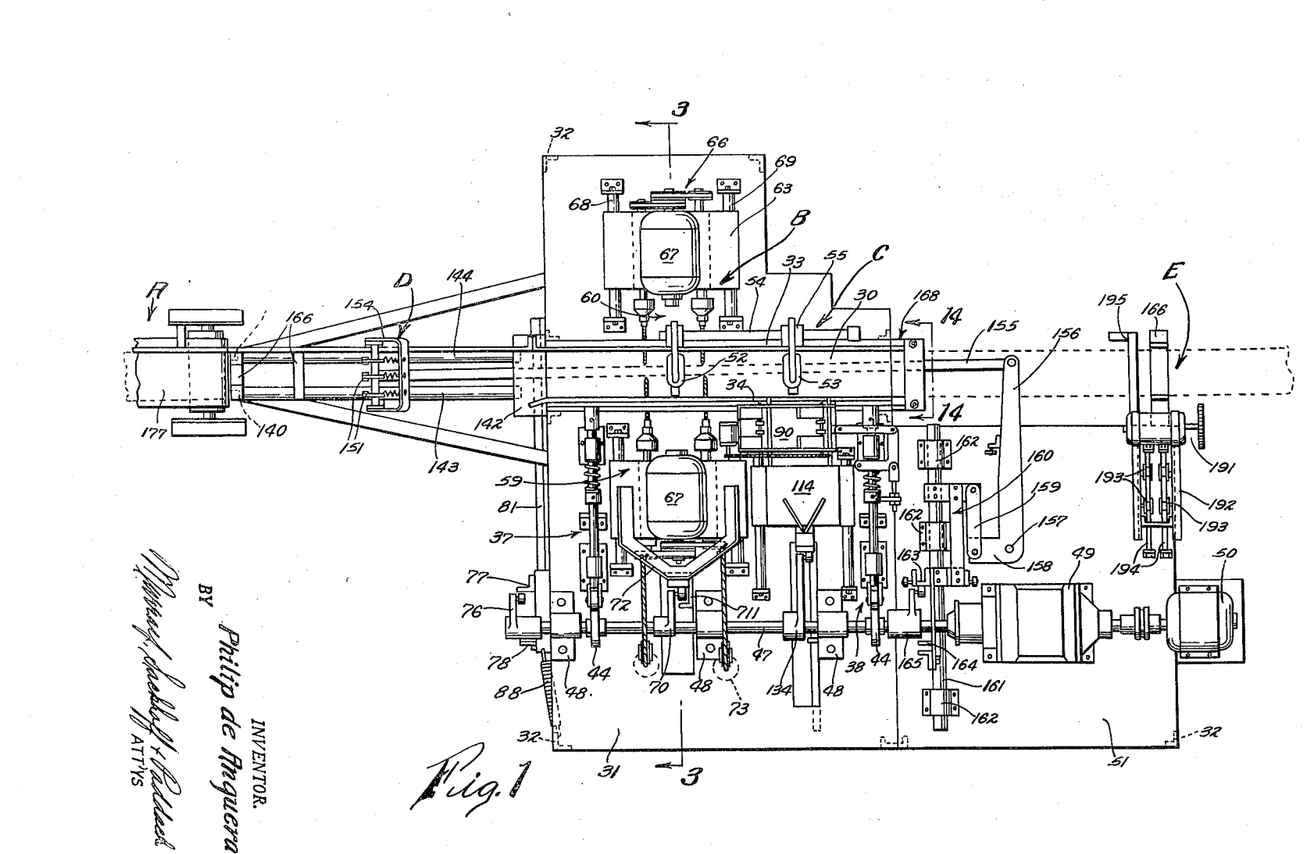
Fig. 1 is a fragmental, plan view of the preferred embodiment of my machine for making a structural member.
Figure 2:
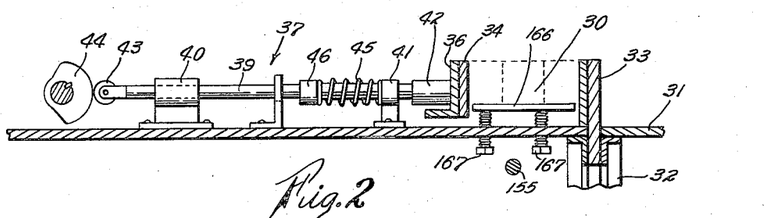
Fig. 2 is a transverse, cross-sectional view taken through the machine and showing in side elevation one of a pair of work clamp means.
Figures 13, 14, 15, 22, 23:
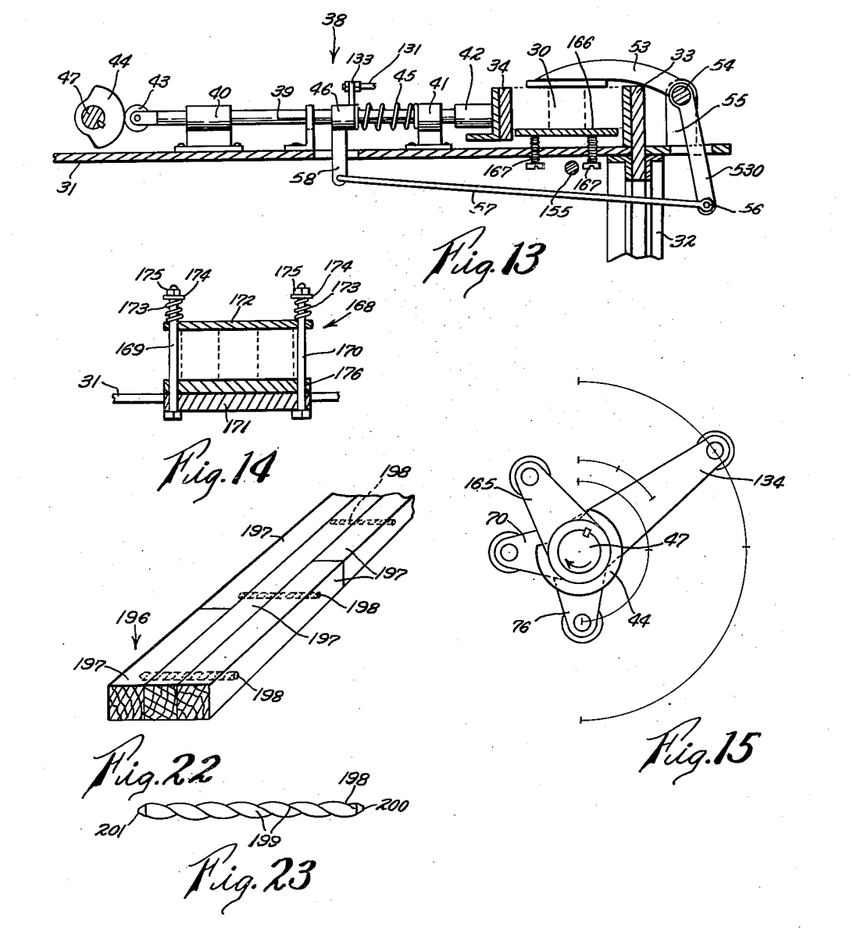
Fig. 13 is a cross-sectional view similar to Fig. 2 showing the remaining operating means for the work clamp of the machine.
Fig. 14 is an enlarged cross-sectional view taken on line 14—14 of Fig. 1.
Fig. 15 is a diagrammatic view of the actuating means for coordinating the functions of the various devices of the machine.
Fig. 22 is a fragmental perspective view of the completed structural unit made by my machine and method.
Fig. 23 is an elevational view of one of the interconnecting dowels for producing the structural unit.

The machine will now be specifically described and, with particular reference to Fig. 1, it comprises a machine bed or base 31 supported upon suitable legs 32, said bed having the work guide 30 extending across it and formed by a longitudinal, upstanding back plate 33 (Figs. 1, 2 and 3), anchored at its lower end between certain bed plates and their respective legs, and an oscillating clamp plate 34 opposed to and positioned in parallelism to the back plate 33. The clamp plate may comprise a flat, elongate metal block 35 secured, as by welding or the like, to a coextensive angle iron 36 which has its lower flange portion extending away from the work guide. The work clamp is supported and oscillated upon the machine base by a pair of identically formed work clamp operating means 37 and 38 each comprising a rod 39 mounted in spaced bearings 40 and 41 and having fixed to one of its ends a coupling block 42 which in turn is welded to the angle iron 36 of the clamp plate 34. The opposed end of the rod has a roller 43 mounted thereon which is constantly urged against the face of a cam 44 by means of a compression spring 45 exerting an expanding force between the bearing 41 and a sleeve 46 fixed to the rod. The clamp operating means 37 is clearly illustrated in Fig. 2 whilst the clamp operating means 38 is shown in Fig. 13. The cams 44 and other operating cam arms are keyed to a common operating shaft 47 (Fig. 1) rotatably mounted upon the machine bed in spaced journal bearings 48 and driven through a speed reducer 49 by a motor 50, said speed reducer and the motor 50 being mounted upon a machine bed section 51 disposed somewhat lower than the machine bed 31.

As most clearly illustrated in Fig. 13 the clamp operating means 38 is adapted to close a pair of spaced work hold-down clamps 52 and 53 which are each fixed at their ends on a cross shaft 54 pivoted to the bed between upstanding bearings 55. The lower end of an arm 530 secured to the cross-shaft 54 is pivotally connected to an operating link 57 secured at its free end to a depending arm 58 formed on the sleeve 46. It will therefore be noted that upon rotation of the operating shaft 47 that cams 44 will oscillate the clamp plate 34 transversely of the work and alternately compress and release the work within the guide 30 whilst the clamps 52 and 53 will be simultaneously actuated with the clamp plate operation to hold the work down upon the work supports within the guide.

Figures 3, 4, 5:
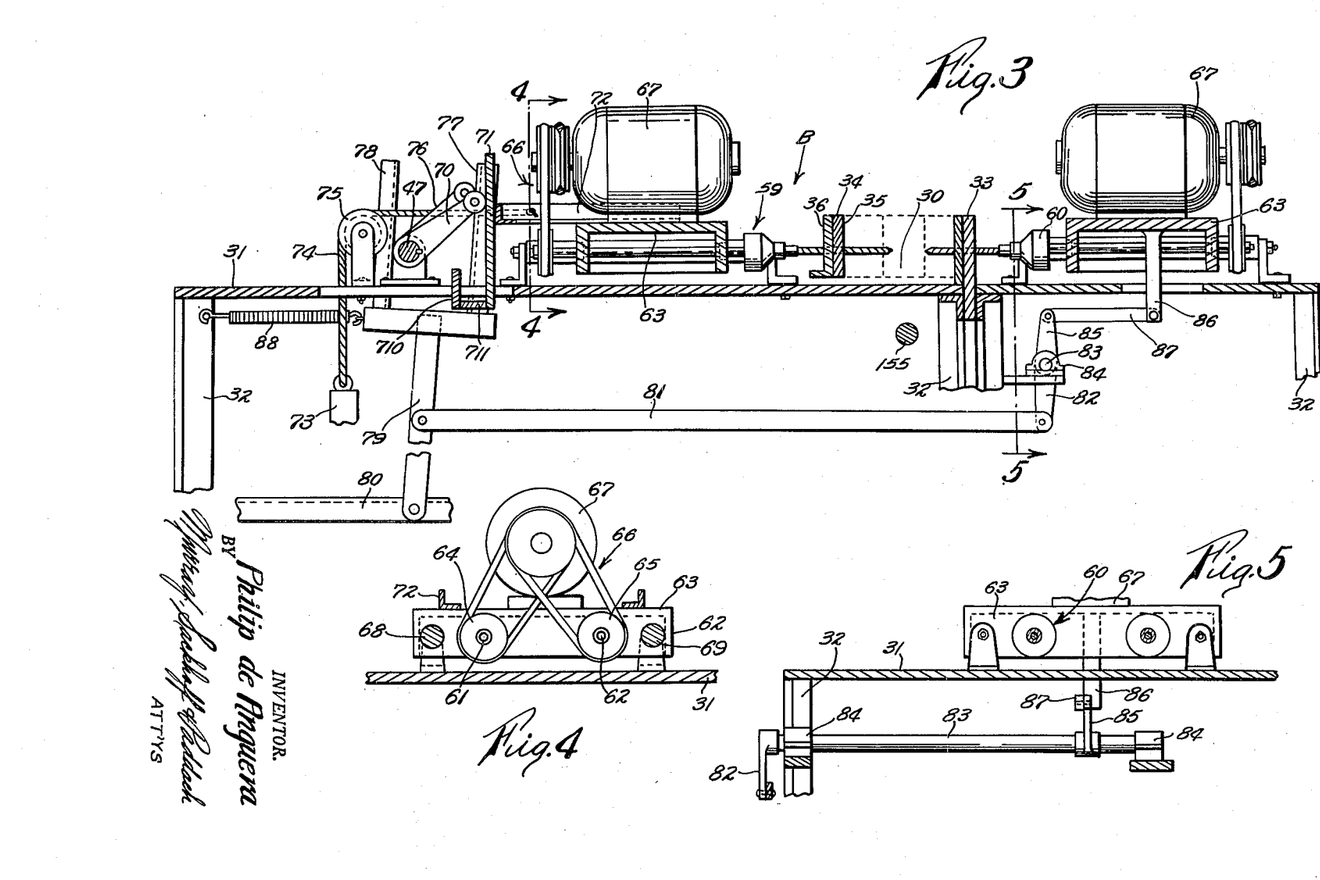
Fig. 3 is an enlarged cross-sectional view taken on line 3—3 of Fig. 1.
Fig. 4 is a cross-sectional view taken on line 4—4 of Fig. 3.
Fig. 5 is a cross-sectional view taken on line 5—5 of Fig. 3.
Figure 6:
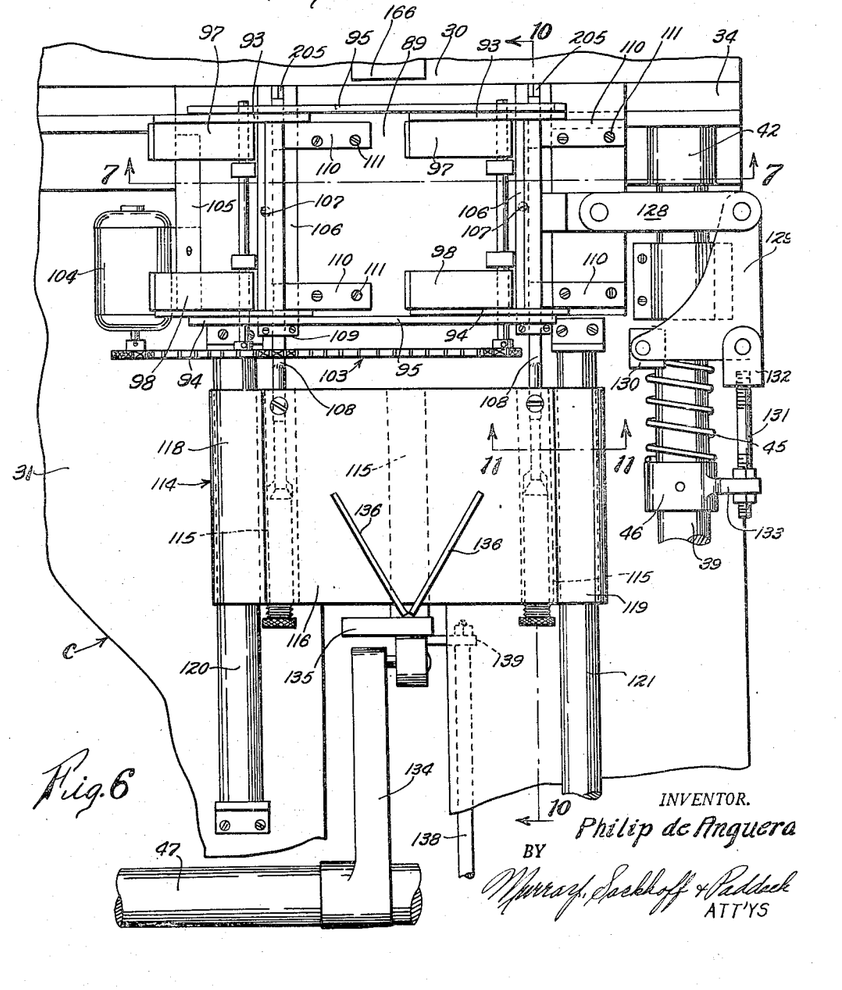
Fig. 6 is an enlarged plan view of the pin driving device for the machine, parts thereof being broken away.

During the elapsed time when the clamp plate 34 and the hold-down clamps 53 are operative to compress the work, transverse holes are drilled through the work and pins are driven into pre-bored holes by the mechanisms at the drilling station B and the pin driving station C respectively. The drilling mechanism is best illustrated in Figs. 3, 4 and 5 and comprises a pair of drilling devices 59 and 60 mounted upon the base, on opposed sides of the work guide 30, for axial reciprocating movement at right angles to the longitudinal extension of said guide. As most clearly illustrated in Figs. 1 and 4, each of the drilling devices may have a pair of spindles 61 and 62 which are each journaled in a suitable carrier frame 63 and are continuously driven by pulleys 64 and 65 respectively through a belt drive 66 with a frame mounted motor 67. As most clearly illustrated in Fig. 3, the carrier frames for the pair of drilling devices are identical in construction and each are mounted for transverse reciprocating movement relative to the work guide upon spaced guide rods 68 and 69 which pass through aligned openings formed in opposed sides of the frame 63. The guide rods 68 and 69 are each mounted upon the machine by end brackets which are suitably bolted to the bed 31. The drilling device 59 is provided with feed and return reciprocating movement by an arm 70 which is keyed to the driven shaft 47. The drilling device is fed upon contact of the arm with the camming surface of a vertical plate 71 mounted on the carrier frame 63 by a triangularly-shaped bracket 72. The return stroke of the drilling device is effected by a plate 710 mounted to the lower portion of the plate 71 by a spacer block 711. A pair of weights 73 is suspended by a cable 74 fastened to the frame 72 and passing over a fixed pulley 75 to provide a positive return stroke for the drilling device.

The drilling device 60 is reciprocated by a cam arm 76 keyed to the end of the driven shaft 47 and alternately engaging the upstanding arms 77 and 78 of a fork-shaped member 79 pivotally mounted at its lower end to a cross-member 80 of the table undercarriage (Fig. 3). A link 81 is pivoted to an intermediate portion of the member 79 and engages at its free end a depending arm 82 secured to the end of a crank shaft 83 which in turn is mounted between journal bearings 84 secured to the machine frame in any suitable manner. An upstanding arm 85, fixed to the shaft 83, is connected by link 87 to a depending lug 86 formed on the carrier frame 63 for the drilling device 60. The return stroke of the drilling device 60 is effected by means of a spring 88 which is secured to the member 79 and to a leg 32 of the machine table. With particular reference to Figs. 3 and 15 it will be noted that the cam arm 70 is fixed to the shaft 47 an angular distance in advance of cam arm 76 to the end that the drilling spindle of the device 59 will have completed its feed stroke to the center of the work and begun its return stroke when the drilling spindle for the device 60 is advanced into the work to overrun the path of the drilling device 59 and complete a transverse bore through the work.

Upon return of the drilling devices 59 and 60 to their inoperative positions, the work is advanced a definite predetermined distance by the advancing means D so that the holes formed thereby are brought into transverse alignment with a pair of pin driving devices at the station C. As illustrated in Figs. 6–12 inclusive, the pin driving mechanism has a horizontal table 89 mounted at its inner end to the clamp plate 34. Preferably the clamp member is provided with an open slot into which the forward end of the table 89 is inserted and said member is fixed therein by welding the end to the clamp member. Mounted upon the table for longitudinal reciprocation is a pin box 90 having a pair of pin magazines 91 and 92 formed therein. The side walls for the box are each formed by a pair of spaced, vertically disposed plates 93 and 94 fixed together by straps 95 and 96. An open bottom for each magazine is formed by inclined bars 97 and 98 which are welded to the opposed side walls and extend downwardly to the level of the top surface of the table 89. The end wall of each magazine is formed by a transverse plate 99 which is secured at its sides to the opposed side walls 93 and 94. As most clearly illustrated in Fig. 7 the inclined bars 97 have vertically disposed lower portions which form a restricted passageway 100 with the end wall and each magazine therefore has a tapered bottom terminating at its bottom in a passageway to singly guide the pins downwardly from the magazine to a pin feeding position.

The pins are continually agitated within the magazines, to insure the bottom-most pin therein falling into the narrow passageway, by square agitating blocks 101 secured to transverse shafts 102 and driven therethrough by a chain and sprocket arrangement 103 by a motor 104 suitably mounted upon a cross-member 105 extending between the bars 97 and 98. Hardened steel, pin guide inserts 106 are secured within suitable transverse recesses formed in the horizontal table 89 by counter-sunk screws 107. The pin guide inserts are each provided with a triangularly-shaped groove 205 which extends across its entire transverse extent and which is adapted to receive the bottom-most pin from the passageway 100 and permit a triangularly-shaped plunger 108 to drive it axially from the recess and into the aligned pre-bored opening formed in the work. The inner end of the insert extends beyond the edge of the table and the exposed groove portion is capped by a hardened steel block 109 for embracing the outer end of the plunger 108 when the plunger is in inoperative position.

Figures 7, 8, 9:
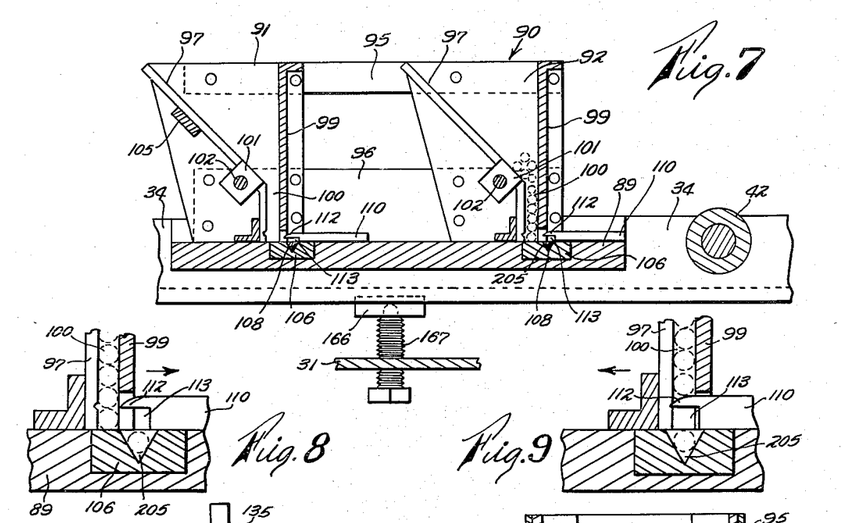

The box 90 is guided for reciprocating, sliding movement upon the table by means of four spaced blocks 110 which are secured to the table by counter-sunk screws 111 and as clearly illustrated in Fig. 7, the blocks are disposed upon the guide inserts 106 and have an upper tapered portion 112 which overhangs the groove 205 and forms between said portion and the insert a pin receiving groove 113. The transverse wall 99 is cut away to permit the tapered portion of the blocks to enter within the pin passageway 100 when the box 90 is reciprocated.

Figures 10, 11, 12:
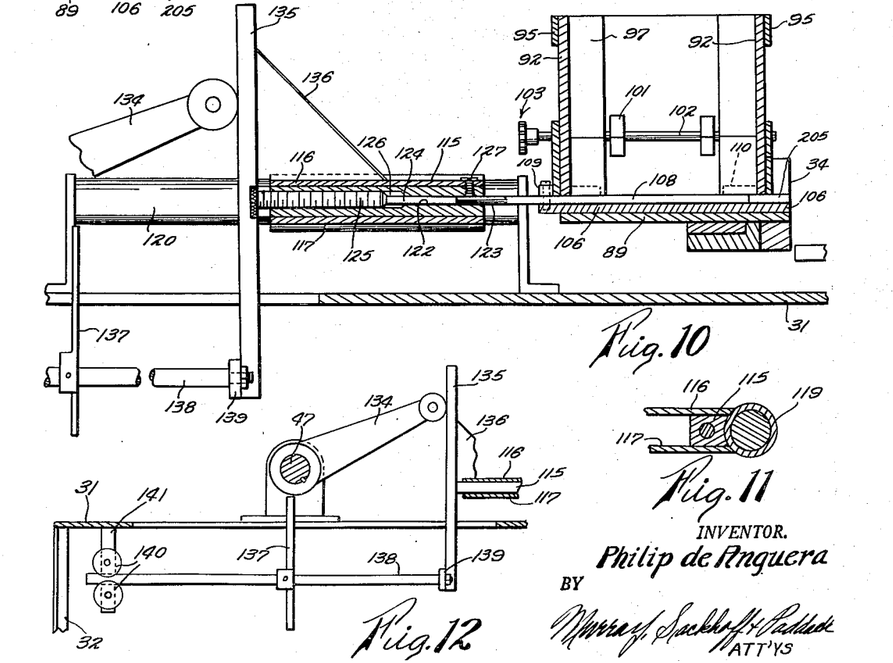
Fig. 10 is a cross-sectional view taken on line 10—10 of Fig. 6.
Fig. 11 is a cross-sectional view taken on line 11—11 of Fig. 6.
Fig. 12 is a fragmental, cross-sectional view taken on a line similar to that of Fig. 10 showing the operating means for the pin driver in side elevation.

The means for feeding and returning the plungers 108 comprises a plunger head 114 which has three longitudinally spaced, transversely positioned blocks 115 fixed to and interconnecting a pair of spaced plates 116 and 117. The transversely extending ends of the plates are secured, as by welding, to spaced guide tubes 118 and 119 (Fig. 11). Transverse guides 120 and 121 are mounted upon the machine bed by suitable brackets passed through the tubes 118 and 119 respectively and serve to support and guide the plunger-head for transverse reciprocating movement upon the machine bed. As most clearly illustrated in Fig. 10, the end blocks 115 are provided at their forward ends with a reduced internal bore 122 for receiving the mounting shank 123 of the plungers 108. A cylindrical extension 124 is formed on the forward end of a set screw 125 which is threaded in an enlarged bore 126 in the blocks and axially aligned with the reduced bore 122. A set screw 127 is adapted to anchor the plungers in the plunger-head against axial withdrawal therefrom.

The pin box is reciprocated longitudinally when the work clamp is actuated and released by means of a link 128 pivotally mounted on the pin box and pinned at its free end to a rocker arm 129. The rocker arm is pivotally mounted on the machine base by bracket 130 and is rocked thereon by an actuating shaft 131 pivotally secured to the rocker by link 132 and adjustably secured at its free end to an extension 133 formed on the sleeve 46 of the work clamp shaft 39.

The pin driver is actuated by a cam arm 134 which is keyed to the cam shaft 47 and engages a cam plate 135 to provide the feed stroke for said plungers. The cam plate is secured to the central block 115 of the plunger-head and is also fastened to the head by angularly disposed gusset plates 136. The return stroke of the plunger-head is effected through engagement of the cam arm 134 with a cam plate 137 which is secured to the cam feed plate 135 by a link 138 (Figs. 10 and 12). The link 138 is bolted to extension 139 formed on the cam plate 135 and is supported at its rear portion between a pair of guide rollers 140 pivotally mounted beneath the machine bed on bracket 141.

With particular reference to Fig. 15 it will be noted that the return stroke of the pin driving mechanism is initiated just prior to the return stroke of the work clamp means but that the work clamp return stroke is accomplished in less time than the driving mechanism and therefore the pin box, attached to the clamp, is at rest in its inoperative position as the pin driver approaches its inoperative position thereby precluding the withdrawal of the pin plungers 108 from their respective recesses and permitting the plunger ends to come to rest beneath the capped portions 109 at the outer ends of said recesses.

When the work clamp is operative to laterally compress the work for simultaneous drilling and pin driving operations the pin box 90 will be in the position illustrated in Figs. 7 and 8 and it will be noted that, in said position, the lowermost pin of the stack is in the groove 205 for axial driving movement into the work by the plungers. After said pins have been driven into the work by the plungers, the work clamp is released and said movement will be transmitted through the rocker arm 129 and its associated mechanism to the box which in turn will be moved in the direction of the arrow in Fig. 8 to assume the inoperative position illustrated in Fig. 9. This movement of the box and work clamp is instituted after the plungers have been withdrawn from the grooves and said movement will cause the passageways 100 to move into alignment with the grooves and in so doing the tapered portion 112 on each block 110 will enter between the two lowermost pins and allow only the bottom pins to be pushed into their respective grooves by the lowermost portions of the walls 97. The tapered portion also serves during said movement to slightly raise the entire stack of pins to preclude clogging of said stack by disarrangement of the pins therein. Upon actuation of the work clamp the box 90 will again move to the position illustrated in Figs. 7 and 8 whereby the lowermost pins are in their respective slots and the pin stacks rest upon the inserts with the lowermost pins therein in position to be pushed into their respective grooves upon the next actuation of the feed box by the work clamp.

Figure 20:
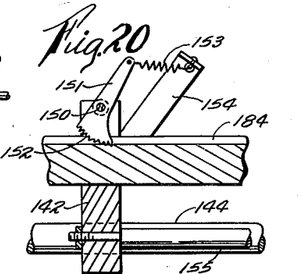
Fig. 20 is a longitudinal sectional view taken through the work feed shown in Fig. 19.
Figure 21:
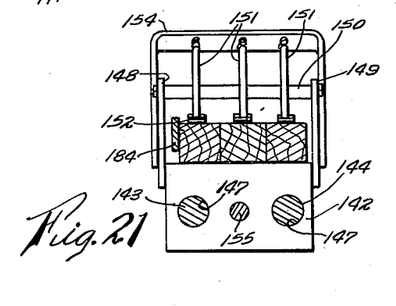
Fig. 21 is a transverse sectional view taken through the work feed illustrated in Fig. 19.

The work is intermittently moved through the work guide 30 at the advancing station D by a work pull head comprising a block 142 guided for reciprocating movement upon a pair of spaced longitudinally extending guide rods 143 and 144 (Figs. 18–21 inclusive) secured at their inner ends to the machine bed by a suitable fastening means 145 and supported at their outer ends in legs 146. As illustrated in Fig. 21, the rods pass through annular guide openings 147 formed longitudinally through the block 142 so that said block may have a longitudinal, planetary movement. Extending upwardly from the sides of the block and fastened thereto are two spaced ears 148 and 149 which support between them a shaft 150 upon which a number of spaced work-engaging dogs 151 are pivotally mounted. As most clearly indicated in Fig. 20, the dogs are provided with serrated work-engaging cam faces 152 and said dogs are urged toward camming action with the work by springs 153 which extend between the upper ends of the dogs and a U-shaped bracket 154 secured, as by welding, to the outer sides of the upstanding ears 148 and 149. The work advancing means is actuated by an elongated rod 155 which is bolted to the block 142 and extends beneath the machine bed and pivotally fastened to a bell crank lever 156 pivotally mounted at 157 to the machine bed 51 (Fig. 1).

The short arm 158 of the bell crank 156 is pivotally secured at its outer end to a link 159 which in turn is pivotally secured at its free end to a rigid frame 160 secured to a transversely reciprocating shaft 161. The shaft 161 is mounted upon journal bearings 162 secured to the machine bed and said rigid frame is provided at its rear end with a feed cam plate 163 and a spaced return cam plate 164 both in position to be engaged by a rotating cam arm 165 keyed to the driven shaft 47.

The work is supported throughout its travel upon transversely extending and longitudinally spaced work supports 166 as it is intermittently moved through the work guide 30 by the means D. As most clearly indicated in Figs. 1, 2 and 13, these work supports may be adjustably mounted for vertical movement on the machine bed 31 by a pair of set screws 167 which are threaded through the bed and rotatably secured to the underside of said supports. The vertical adjustment provides a means for adjusting the machine to produce structural members of varying thicknesses by making adjustments in the vertical positions of said work supports.

As illustrated in Figs. 1 and 14, the work is intermittently advanced through the machine against the action of a yieldable work clamp 168 which retards the forward movement of the work and forms in conjunction with the work feeding means D a positive means for progressively advancing the work a definite distance during each feed stroke of the work feeder This work clamp is clearly illustrated in Fig. 14 wherein a pair of spaced tie-bolts 169 and 170 project from an extension 171 formed on the table 31. The upper ends of the bolts pass through openings formed in a clamp plate 172 and said plate is yieldingly urged against the work by compression springs 173 disposed between the plate and an adjustable washer 174 encircling the upper end of the bolt and backed by a nut 175 threaded to said bolt. A suitable filler block 176 is positioned upon the extension 171 to accommodate the clamp for various thicknesses of work passing therethrough.

Figure 16:
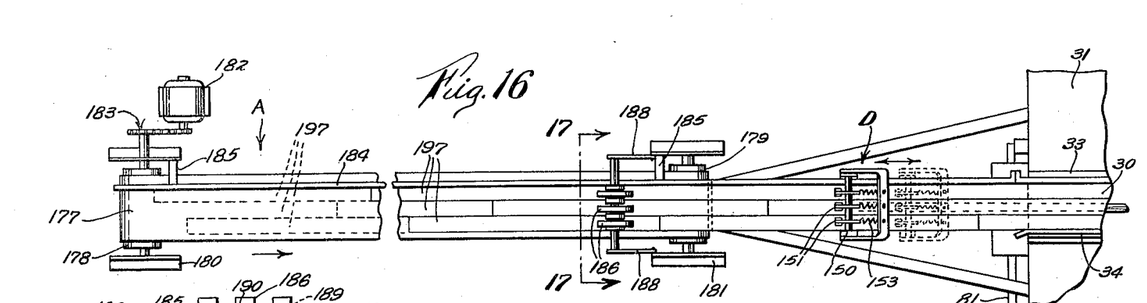
Fig. 16 is a plan view of the strip assembly station for my machine.
Figure 17:
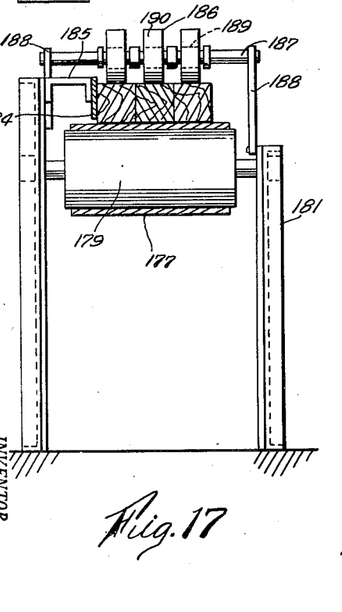
Fig. 17 is an enlarged cross-sectional view taken on line 17—17 of Fig. 16.
Figure 18:
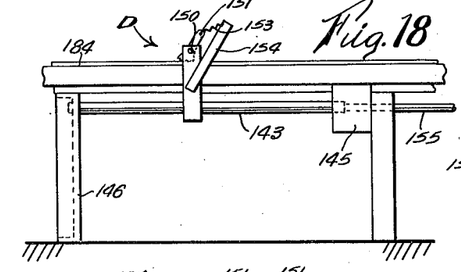
Fig. 18 is a fragmental side elevational view of the work feed device for the machine illustrated in Fig. 1.
Figure 19:
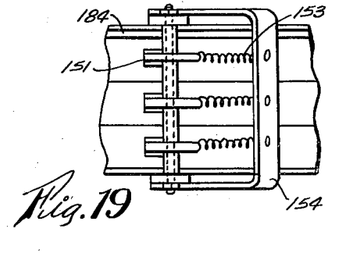
Fig. 19 is a fragmental top plan view of the work feed.

The wood strip assembling means A is particularly illustrated in Figs. 16, 17 and 18 and is there illustrated as an endless belt 177 passing around and supported by end rollers 178 and 179 journaled in suitable supporting standards 180 and 181 respectively. The roller 179 is disposed adjacent the outer end of the intermittent feed station B for the machine and is positioned so that the upper reach of the belt is on the same level with the work supports 166 and is adjacent to the outer support therefor. The belt is driven at a rate of speed in excess of the rectilinear speed for the feeding stroke of the intermittently actuated work clamp by a motor 182 through sprocket and chain arrangement generally indicated by the reference numeral 183. A longitudinal guide 184 is positioned along one side of the conveyor and is supported above the belt by suitable brackets 185 secured to the standards 180 and 181, said guide extending through the work advancing station and disposed in alignment with the stop plate 33 for the work guide 30 extending across the machine bed. A number of hold-down rollers 186 are mounted upon a transversely extending shaft 187 which is secured to the standard 181 by spaced arms 188. The wheels are made from a heavy metal, and are provided with oversize bearing holes 189 to compensate for varying thicknesses of wood strips, suitable sleeves 190 being fixed to the shaft 187 to maintain the wheels in position above their respective rows of strips.

It is also contemplated that my machine have a means for cutting the finished structural unit into desired lengths and, to this end, I have provided a saw station E at the work exit end of the machine, said saw station having a circular saw and motor 191 secured to a transversely reciprocating frame 192. The frame is provided with rollers 193 which move upon tracks 194 secured to the machine bed 51. The saw may be moved transversely through the work when the latter is at rest by a manually operated lever 195 or it may be synchronized with a part of the machine which is actuated when the work is at rest; such as the drilling devices or the plunger-head feeding device.

*Operation*

In order to facilitate the description of the operation of my machine and the method for making a structural member, the member will first be described and as indicated in Figs. 22 and 23 the member 196 comprises a number of unequal lengths of green wood strips 197 assembled in adjacent longitudinal rows and fixed therein by transversely extending, longitudinally spaced dowel pins 198. It will be noted that the grain of each green wood strip is disposed in a substantially upright or vertical position as it is assembled in its respective row so that the greater amount of expansion and contraction of the strips will take place in substantially vertical directions and preclude undue changes in the width of the completed structural unit. These pins are made of metal, are substantially square in cross-section, and are provided with spiral threads 199 which extend through their entire lengths. Both ends of the dowel pins are tapered as at 200 and 201, the tapered end 200 serving as a pilot to permit driving of the pin into the pre-formed holes in the work whilst the tapered end 201 provides a reduced contacting surface on the pin with the end of its driving plunger to thereby reduce friction between the pin and plunger when it is being driven into said pre-bored holes.

In operation therefore a number of green lumber strips 197, having indiscriminate or unequal lengths, are manually positioned upon the continuously moving conveyor belt 177 at the assembly station A. The strips so assembled are disposed in end-to-end relationship to form a number of longitudinal, adjacent rows, and the movement of the belt, upon which the longitudinal rows of strips are positioned, in conjunction with the hold-down rollers for the rows, constantly urges the assembled rows toward the intermittently actuated work advancing means D for the joining mechanism of the machine. The initial position for the work advancing means is illustrated in Fig. 16 in full lines whilst the end of said work advancing stroke is shown in dotted lines in said view, it being understood that the dogs 151 are urged toward camming action with the work by the springs 153 and the resistance of the work clamp 168 to the movement of the work through work guide 30 causes the dogs to instantly bite into and clamp the work in the advancing means so that each feed stroke will progressively advance the work an identical distance through the machine. The speed of the conveyor belt 177 is substantially greater than the speed of the feed stroke of the advancing means D so that the assembled strips will be constantly urged in end-to-end abutting relationship during the feed stroke of the advancing means and also when the advancing means is returned or at rest.

Whilst the advancing means is at rest, the clamp plate 34 is transversely operated to compress the adjacent rows of strips together against the stop plate 33 and simultaneously with the operation of said clamp plate, hold-down clamps 52 and 53 compress the strips in a vertical direction whereupon the drilling devices 59 and 60 are fed into the work to form a pair of through-bores extending transversely through the work. Upon return of the drilling devices, the work clamp is released and the work advancing means D moves the work a definite distance through the work guide 30 until the pair of bores in the work are in transverse alignment with the pin driver station C. The work clamp is again actuated and the drilling devices and the pin driving mechanism thereafter are fed and returned simultaneously relative to the work and the pins are driven into pre-bored holes formed in the work. Upon return of the drilling devices and the pin driving mechanism to inoperative position, the work clamp is withdrawn and the work again advanced a predetermined distance through the guide. This cycle is continued thus forming a continuous structural unit which moves from the exit end of the machine and is cut into suitable lengths at the saw station E.

What is claimed is:

1. In a machine for making a structural member the combination with a base, and a horizontal work guide on the base having an elongate, stationary back plate and a transversely movable, elongate clamp plate disposed in parallelism with the back plate, of a table mounted on the clamp plate and having an open-topped, transversely extending pin holding recess formed therein, a pin box positioned for longitudinal sliding movement upon the table, a pin magazine in the box, a pin feeding passageway depending from the magazine and normally disposed above the recess to receive the lowermost pin from the passageway, a reciprocating plunger axially movable in the recess and normally adapted to axially drive the pin from the recess into a structural member held in the work guide, and means on the base for reciprocating the box and adapted to move the passageway out of alignment with the pin recess when the plunger is at the end of its driving stroke and to return the passageway and recess to normal positions prior to the succeeding plunger drive stroke.

2. In a machine for making a structural member the combination with a base and a horizontal work guide on the base having an elongate, stationary back plate and a transversely movable, elongate clamp plate disposed in parallelism with the back plate, of a table mounted on the clamp plate and having an open-topped, transversely extending pin holding recess formed therein, a pin box positioned for longitudinal sliding movement upon the table, a pin magazine in the box, a pin feeding passageway depending from the magazine and normally disposed above the recess, spaced pin box guides fixed to the table adjacent the recess, upper tapered portions formed on the guides and normally overhanging the pin insert and forming with the table a pin receiving groove, a reciprocating plunger axially movable in the recess and normally adapted to axially drive a pin from the recess into a structural member held in the work guide, and means on the base for reciprocating the box and adapted to move the passageway out of alignment with the pin recess when the plunger is at the end of its driving stroke to permit the lowermost pin therein to fall upon the table and to return the passageway and recess to normal positions prior to the succeeding plunger drive stroke.

3. In a machine for making a structural member the combination with a base, and a horizontal work guide on the base having an elongate, stationary back plate and a transversely movable, elongate clamp plate disposed in parallelism with the back plate, of a table mounted on the clamp plate and having an open-topped, transversely extending pin holding recess formed therein, a pin box positioned for longitudinal sliding movement upon the table, a pin magazine in the box, a pin feeding passageway depending from the magazine and normally disposed above the recess to receive the lowermost pin from the passageway, agitator blocks rotatably mounted beneath the magazine, a reciprocating plunger axially movable in the recess and normally adapted to axially drive the pin from the recess into a structural member held in the work guide, and means on the base for reciprocating the box and adapted to move the passageway out of alignment with the pin recess when the plunger is at the end of its driving stroke and to return the passageway and recess to normal positions prior to the succeeding plunger drive stroke.

4. In a machine for making a structural member the combination with a base, and a horizontal work guide on the base having an elongated, stationary back plate and a transversely movable, elongate clamp plate disposed in parallelism with the back plate, of a table mounted on the clamp plate and having an open-topped, transversely extending V-shaped pin holding recess formed therein, a pin box positioned for longitudinal sliding movement upon the table, a pin magazine in the box, a pin feeding passageway depending from the magazine and normally disposed above the recess to receive the lowermost pin from the passageway, a reciprocating V-shaped plunger axially movable in the recess and normally adapted to axially drive the pin from the recess into a structural member held in the work guide, and means for reciprocating the box and adapted to move the passageway out of alignment with the pin recess when the plunger is at the end of its driving stroke and to return the passageway and recess to normal positions prior to the succeeding plunger drive stroke.

PHILIP DE ANGUERA.

REFERENCES CITED

The following references are of record in the file of this patent:

UNITED STATES PATENTS

| Number | Name | Date |
|---|---|---|
| 551,531 | Doman | Dec. 17, 1895 |
| 580,273 | Grier | Apr. 6, 1897 |
| 915,504 | Sutter | Mar. 16, 1909 |
| 1,052,600 | Linderman | Feb. 11, 1913 |
| 1,241,871 | Meyers | Oct. 2, 1917 |
| 1,454,751 | Littlefield | May 8, 1923 |
| 1,454,841 | Allen | May 15, 1923 |
| 1,578,898 | Littleford | Mar. 30, 1926 |
| 1,693,606 | Jones | Dec. 4, 1928 |
| 1,702,185 | Weber | Feb. 12, 1929 |
| 1,702,370 | Trevellyan | Feb. 19, 1929 |
| 1,805,906 | Dennis | May 19, 1931 |
| 1,829,971 | Trevellyan | Nov. 3, 1931 |
| 1,982,713 | Welch | Dec. 4, 1934 |
| 1,986,458 | Young | Jan. 1, 1935 |
| 2,038,000 | Parker | Apr. 21, 1936 |
| 2,300,728 | Goss | Nov. 3, 1942 |